United States Patent
Jalan et al.

(10) Patent No.: US 9,338,225 B2
(45) Date of Patent: May 10, 2016

(54) FORWARDING POLICIES ON A VIRTUAL SERVICE NETWORK

(71) Applicant: A10 Networks, Inc., San Jose, CA (US)

(72) Inventors: Rajkumar Jalan, Saratoga, CA (US); Gurudeep Kamat, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 579 days.

(21) Appl. No.: 13/706,363

(22) Filed: Dec. 6, 2012

(65) Prior Publication Data

US 2014/0164617 A1 Jun. 12, 2014

(51) Int. Cl.
*H04L 29/08* (2006.01)
*H04L 29/06* (2006.01)

(52) U.S. Cl.
CPC ............ *H04L 67/1002* (2013.01); *H04L 67/10* (2013.01); *H04L 67/12* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,218,602 A | 6/1993 | Grant et al. | |
| 5,774,660 A | 6/1998 | Brendel et al. | |
| 5,935,207 A | 8/1999 | Logue et al. | |
| 5,958,053 A | 9/1999 | Denker | |
| 6,003,069 A | 12/1999 | Cavill | |
| 6,047,268 A | 4/2000 | Bartoli et al. | |
| 6,219,706 B1 | 4/2001 | Fan et al. | |
| 6,321,338 B1 | 11/2001 | Porras et al. | |
| 6,374,300 B2 | 4/2002 | Masters | |
| 6,587,866 B1 | 7/2003 | Modi et al. | |
| 6,748,414 B1 | 6/2004 | Bournas | |
| 6,772,334 B1 | 8/2004 | Glawitsch | |
| 6,779,033 B1 | 8/2004 | Watson et al. | |
| 7,010,605 B1 | 3/2006 | Dharmarajan | |
| 7,058,718 B2 | 6/2006 | Fontes et al. | |
| 7,069,438 B2 | 6/2006 | Balabine et al. | |

(Continued)

FOREIGN PATENT DOCUMENTS

| | | |
|---|---|---|
| CN | 1372662 A | 10/2002 |
| CN | 1449618 | 10/2003 |

(Continued)

OTHER PUBLICATIONS

Spatscheck et al., "Optimizing TCP Forwarder Performance", IEEE/ACM Transactions on Networking, vol. 8, No. 2, Apr. 2000.

(Continued)

*Primary Examiner* — Ninos Donabed
(74) *Attorney, Agent, or Firm* — Carr & Ferrell LLP

(57) ABSTRACT

In providing packet forwarding policies in a virtual service network that includes a network node and a pool of service load balancers serving a virtual service, the network node: receives a virtual service session request from a client device, the request including a virtual service network address for the virtual service; compares the virtual service network address in the request with the virtual service network address in each of a plurality of packet forwarding policies; in response to finding a match between the virtual service network address in the request and a given virtual service network address in a given packet forwarding policy, determines the given destination in the given packet forwarding policy; and sends the request to a service load balancer in the pool of service load balancers associated with the given destination, where the service load balancer establishes a virtual service session with the client device.

37 Claims, 12 Drawing Sheets

(56) References Cited

U.S. PATENT DOCUMENTS

| | | |
|---|---|---|
| 7,076,555 B1 | 7/2006 | Orman et al. |
| 7,143,087 B2 | 11/2006 | Fairweather |
| 7,181,524 B1 | 2/2007 | Lele |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1* | 12/2008 | Eppstein .............. G06F 9/5001 370/468 |
| 7,467,202 B2 | 12/2008 | Savchuk |
| 7,472,190 B2 | 12/2008 | Robinson |
| 7,506,360 B1 | 3/2009 | Wilkinson et al. |
| 7,509,369 B1* | 3/2009 | Tormasov ............. G06F 9/5077 709/201 |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1* | 4/2010 | Eppstein ............. H04L 41/0896 709/220 |
| 7,707,295 B1 | 4/2010 | Szeto et al. |
| 7,711,790 B1 | 5/2010 | Barrett et al. |
| 7,747,748 B2 | 6/2010 | Allen |
| 7,792,113 B1 | 9/2010 | Foschiano et al. |
| 7,826,487 B1 | 11/2010 | Mukerji et al. |
| 7,881,215 B1 | 2/2011 | Daigle et al. |
| 7,970,934 B1 | 6/2011 | Patel |
| 7,990,847 B1 | 8/2011 | Leroy et al. |
| 7,991,859 B1 | 8/2011 | Miller et al. |
| 8,019,870 B1* | 9/2011 | Eppstein ............. H04L 41/5051 709/220 |
| 8,032,634 B1* | 10/2011 | Eppstein ................ H04L 67/34 709/226 |
| 8,090,866 B1 | 1/2012 | Bashyam et al. |
| 8,122,116 B2 | 2/2012 | Matsunaga et al. |
| 8,179,809 B1* | 5/2012 | Eppstein .............. G06F 9/5061 370/252 |
| 8,185,651 B2 | 5/2012 | Moran et al. |
| 8,191,106 B2 | 5/2012 | Choyi et al. |
| 8,224,971 B1 | 7/2012 | Miller et al. |
| 8,296,434 B1 | 10/2012 | Miller et al. |
| 8,312,507 B2 | 11/2012 | Chen et al. |
| 8,379,515 B1 | 2/2013 | Mukerji |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,681,610 B1 | 3/2014 | Mukerji |
| 8,782,221 B2 | 7/2014 | Han |
| 8,813,180 B1 | 8/2014 | Chen et al. |
| 8,826,372 B1 | 9/2014 | Chen et al. |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,154,584 B1 | 10/2015 | Han |
| 2001/0049741 A1 | 12/2001 | Skene et al. |
| 2002/0032777 A1 | 3/2002 | Kawata et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1* | 9/2002 | Sim ................... G06F 17/30067 |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0194335 A1* | 12/2002 | Maynard ................ G06F 9/505 709/225 |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1* | 1/2003 | Parmar ............... H04L 41/0893 709/223 |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1* | 10/2004 | Hydrie ................. H04L 12/4641 709/201 |
| 2004/0210663 A1 | 10/2004 | Phillips et al. |
| 2004/0213158 A1 | 10/2004 | Collett et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1* | 5/2006 | Arregoces ............... H04L 45/24 370/396 |
| 2006/0098645 A1 | 5/2006 | Walkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0094396 A1* | 4/2007 | Takano ............... H04L 67/1008 709/226 |
| 2007/0118881 A1 | 5/2007 | Mitchell et al. |
| 2007/0156919 A1 | 7/2007 | Potti et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |

(56) References Cited

U.S. PATENT DOCUMENTS

| | | |
|---|---|---|
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0228781 A1 | 9/2008 | Chen et al. |
| 2008/0250099 A1 | 10/2008 | Shen et al. |
| 2008/0271130 A1* | 10/2008 | Ramamoorthy .. G06F 17/30171 726/9 |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0228547 A1 | 9/2009 | Miyaoka et al. |
| 2010/0008229 A1 | 1/2010 | Bi et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0083076 A1 | 4/2010 | Ushiyama |
| 2010/0094985 A1 | 4/2010 | Abu-Samaha et al. |
| 2010/0106833 A1 | 4/2010 | Banerjee et al. |
| 2010/0106854 A1 | 4/2010 | Kim et al. |
| 2010/0162378 A1 | 6/2010 | Jayawardena et al. |
| 2010/0210265 A1 | 8/2010 | Borzsei et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0093522 A1 | 4/2011 | Chen et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1* | 11/2011 | Maldaner ................ H04L 41/00 709/226 |
| 2011/0276982 A1 | 11/2011 | Nakayama et al. |
| 2011/0289496 A1 | 11/2011 | Steer |
| 2011/0302256 A1 | 12/2011 | Sureshchandra et al. |
| 2011/0307541 A1 | 12/2011 | Walsh et al. |
| 2012/0023231 A1* | 1/2012 | Ueno ...................... H04L 45/38 709/225 |
| 2012/0030341 A1 | 2/2012 | Jensen et al. |
| 2012/0066371 A1* | 3/2012 | Patel ................... H04L 67/1031 709/224 |
| 2012/0084419 A1 | 4/2012 | Kannan et al. |
| 2012/0084460 A1 | 4/2012 | McGinnity et al. |
| 2012/0117571 A1* | 5/2012 | Davis .................. H04L 41/0806 718/105 |
| 2012/0144014 A1* | 6/2012 | Natham ................. H04L 45/66 709/224 |
| 2012/0144015 A1 | 6/2012 | Jalan et al. |
| 2012/0151353 A1* | 6/2012 | Joanny ................ H04L 29/0899 715/735 |
| 2012/0170548 A1 | 7/2012 | Rajagopalan et al. |
| 2012/0173759 A1 | 7/2012 | Agarwal et al. |
| 2012/0191839 A1 | 7/2012 | Maynard |
| 2012/0239792 A1* | 9/2012 | Banerjee ............ H04L 67/1097 709/223 |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0046876 A1 | 2/2013 | Narayana et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0136139 A1 | 5/2013 | Zheng et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0282791 A1* | 10/2013 | Kruglick ............... G06F 3/0647 709/203 |
| 2014/0012972 A1 | 1/2014 | Han |
| 2014/0089500 A1 | 3/2014 | Sankar et al. |
| 2014/0169168 A1 | 6/2014 | Jalan et al. |
| 2014/0207845 A1 | 7/2014 | Han et al. |
| 2014/0258536 A1 | 9/2014 | Chiong |
| 2014/0269728 A1 | 9/2014 | Jalan et al. |
| 2014/0330982 A1 | 11/2014 | Jalan et al. |
| 2014/0359052 A1 | 12/2014 | Joachimpillai et al. |
| 2015/0039671 A1 | 2/2015 | Jalan et al. |
| 2015/0156223 A1 | 6/2015 | Xu et al. |
| 2015/0281087 A1 | 10/2015 | Jalan et al. |
| 2015/0281104 A1 | 10/2015 | Golshan et al. |
| 2015/0296058 A1 | 10/2015 | Jalan et al. |

FOREIGN PATENT DOCUMENTS

| | | |
|---|---|---|
| CN | 1529460 | 9/2004 |
| CN | 1575582 | 2/2005 |
| CN | 1725702 | 1/2006 |
| CN | 101004740 A | 7/2007 |
| CN | 101094225 | 12/2007 |
| CN | 101189598 | 5/2008 |
| CN | 101247349 A | 8/2008 |
| CN | 101261644 A | 9/2008 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| EP | 1209876 A2 | 5/2002 |
| EP | 1770915 A1 | 4/2007 |
| EP | 1885096 A1 | 2/2008 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| HK | 1182560 | 11/2013 |

(56) References Cited

FOREIGN PATENT DOCUMENTS

| | | |
|---|---|---|
| HK | 1183569 A | 12/2013 |
| HK | 1183996 A | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| IN | 39/2015 | 9/2015 |
| JP | H09-097233 | 4/1997 |
| JP | H11-338836 | 10/1999 |
| JP | 2000276432 A | 10/2000 |
| JP | 2000307634 A | 11/2000 |
| JP | 2001051859 A | 2/2001 |
| JP | 2006332825 A | 12/2006 |
| JP | 2008040718 A | 2/2008 |
| JP | 2013528330 | 5/2011 |
| JP | 2014-143686 | 8/2014 |
| JP | 2015507380 A | 3/2015 |
| KR | 10-0830413 B1 | 5/2008 |
| KR | 1020120117461 | 8/2013 |
| WO | 01/13228 A2 | 2/2001 |
| WO | 0114990 | 3/2001 |
| WO | WO0145349 | 6/2001 |
| WO | 03103237 | 12/2003 |
| WO | WO2004084085 A1 | 9/2004 |
| WO | 2008053954 | 5/2008 |
| WO | 2011049770 | 4/2011 |
| WO | WO2011079381 A1 | 7/2011 |
| WO | 2011149796 A2 | 12/2011 |
| WO | 2012050747 | 4/2012 |
| WO | 2012075237 A2 | 6/2012 |
| WO | 2013070391 A1 | 5/2013 |
| WO | 2013081952 A1 | 6/2013 |
| WO | 2013096019 A1 | 6/2013 |
| WO | 2013112492 | 8/2013 |
| WO | 2014052099 | 4/2014 |
| WO | 2014088741 | 6/2014 |
| WO | 2014093829 | 6/2014 |
| WO | 2014138483 | 9/2014 |
| WO | 2014144837 | 9/2014 |
| WO | WO 2014179753 | 11/2014 |
| WO | WO2015153020 A1 | 10/2015 |

OTHER PUBLICATIONS

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Cardellini et al., "Dynamic Load Balancing on Web-server Systems", IEEE Internet Computing, vol. 3, No. 3, pp. 28-39, May-Jun. 1999.

Goldszmidt et al. NetDispatcher: A TCP Connection Router, IBM Research Report RC 20853, May 19, 1997.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

* cited by examiner

FORWARDING POLICIES ON A VIRTUAL SERVICE NETWORK

BACKGROUND OF THE INVENTION

1. Field

This invention relates generally to data communications, and more specifically, to a virtual service network.

2. Background

Service load balancers such as server load balancers or application delivery controllers typically balance load among a plurality of servers providing network services such as Web documents, voice calls, advertisements, enterprise applications, video services, gaming, or consuming broadband services. A service is used by many client computers. Some services are offered for few clients and some services are offered to many clients. Typically a service is handled by a service load balancer. When there are many clients utilizing the service at the same time, the service load balancer will handle the distribution of client service accesses among the servers. However, as the capacity of the service load balancer is reached, a network administrator cannot easily add a second service load balancer, since a service is typically assigned to an IP address of the service load balancer. Adding another service load balancer having the same IP address for the service is not possible in a data network. Network nodes in the data network would not be able to determine which service load balancer to send a client service access to.

The scaling of service demand has not been a problem in the past as computing capacity of service load balancer was able to keep up with client service demand. However, as mobile computing becomes pervasive and as more traditional non networking services such as television, gaming, and advertisement are migrating to data networks, the demand for client services has surpassed the pace of processing improvement. The need to scale to a plurality of service load balancers to support a network service is imminent.

The present invention describes a virtual service network wherein network nodes in the virtual service network are capable of processing client service sessions of a network service and forwarding the sessions to a plurality of service load balancers.

BRIEF SUMMARY OF THE INVENTION

According to one embodiment of the present invention, a method for providing forwarding policies in a virtual service network, the virtual service network comprising a network node and a pool of service load balancers serving a virtual service associated with a virtual service network address, comprises: (a) receiving a virtual service session request from a client device by the network node, the virtual service session request comprising the virtual service network address for the virtual service served by the pool of service load balancers, wherein the network node comprises a plurality of packet forwarding policies, each packet forwarding policy comprising a virtual service network address associated with a destination; (b) comparing by the network node the virtual service network address in the virtual service session request with the virtual service network address in each packet forwarding policy; (c) in response to finding a match between the virtual service network address in the virtual service session request and a given virtual service network address in a given packet forwarding policy, determining the given destination in the given packet forwarding policy by the network node; and (d) sending the virtual service session request to a service load balancer in the pool of service load balancers associated with the given destination, wherein the service load balancer establishes a virtual service session with the client device.

In one aspect of the present invention, after the service load balancer establishes the virtual service session with the client device, the method further comprises: (e) receiving a virtual service request from the client device through the virtual service session by the network node, the virtual service request comprising the virtual service network address for the virtual service; (f) comparing by the network node the second virtual service network address in the virtual service request with the virtual service network address in each packet forwarding policy; (g) in response to finding a match between the virtual service network address in the virtual service request and a second given virtual service network address in a second given packet forwarding policy, determining a second given destination in the second given packet forwarding policy by the network node; and (h) sending the virtual service request to a second service load balancer associated with the second given destination by the network node.

In one aspect of the present invention, the method further comprises: (i) receiving a virtual service data packet from the client device through the virtual service session by the network node, the virtual service data packet comprising the virtual service network address for the virtual service; (j) comparing by the network node the virtual service network address in the virtual service data packet with the virtual service network address in each packet forwarding policy; (k) in response to finding a match between the virtual service network address in the virtual service data packet and a third given virtual service network address in a third given packet forwarding policy, determining a third given destination in the third given packet forwarding policy by the network node; and (l) sending the virtual service data packet to a third service load balancer associated with the third given destination by the network node.

In one aspect of the present invention, the service load balancer, the second service load balancer, and the third service load balancer are the same service load balancer.

In one aspect of the present invention, the method further comprises: (e) receiving a data packet of the virtual service session by the network node from the service load balancer over a data network, the data packet comprising a client network address of the client device; (f) retrieving the client network address from the data packet by the network node; and (g) sending the data packet to the client device using the client network address by the network node.

In one aspect of the present invention, the data packet comprises a virtual service session request response or a virtual service request response.

In one aspect of the present invention, the given destination comprises a second network node, wherein the sending (d) comprises: (d1) sending the virtual service session request to the second network node, wherein the second network node comprises a second plurality of packet forwarding policies, each of the second packet forwarding policies comprising a second virtual service network address associated with a second destination; (d2) comparing by the second network node the virtual service network address in the virtual service session request with the virtual service network address in each of the second packet forwarding policies; (d3) in response to finding a match between the virtual service network address in the virtual service session request and a second given virtual service network address in a second given packet forwarding policy, determining a second given destination in the second given packet forwarding policy by the second network node; and (d4) sending the virtual service session request to the service load balancer associated with the second given destination, wherein the service load balancer establishes a virtual service session with the client device.

In one aspect of the present invention, the determining (c) comprises: (c1) finding by the network node that the virtual service network address in the virtual service session request matches a first virtual service network address in a first packet forwarding policy and a second virtual network address in a second packet forwarding policy; (c2) selecting by the network node either the first packet forwarding policy or the second packet forwarding policy based on additional information comprised in the first and second packet forwarding policies; and (c3) determining the given destination in the selected packet forwarding policy by the network node.

In one aspect of the present invention, wherein the additional information comprises one or more of the following: a multi-path factor; and a traffic policy.

In one aspect of the present invention, the first packet forwarding policy comprises a first destination associated with a first service load balancer in the pool of service load balancers, and the second packet forwarding policy comprises a second destination associated with a second service load balancer in the pool of service load balancers, wherein the first service load balancer is different from the second service load balancer, wherein the determining (c3) comprises: (c3i) in response to selecting the first packet forwarding policy, determining the first destination associated with the first service load balancer in the first packet forwarding policy by the network node; and (c3ii) in response to selecting the second packet forwarding policy, determining the second destination in the second packet forwarding policy in the second packet forwarding policy by the network node.

In one aspect of the present invention, the network node comprises a first plurality of packet forwarding policies for a first virtual service and a second plurality of packet forwarding policies for a second virtual service, wherein the comparing (b) comprises: (b1) determining by the network node whether the virtual service session request is for the first virtual service or the second virtual service; (b2) in response to determining that the virtual service session request is for the first virtual service, comparing by the network node the virtual service network address in the virtual service session request with a virtual service network address in each of the first plurality of packet forwarding policies; and (b3) in response to determining that the virtual service session request is for the first virtual service, comparing by the network node the virtual service network address in the virtual service session request with a virtual service network address in each of the second plurality of packet forwarding policies.

In one aspect of the present invention, the virtual service session request further comprises a client network address of the client device, and each packet forwarding policy further comprises a client network address associated with the destination, wherein the comparing (b) and the determining (c) comprise: (b1) comparing by the network node the virtual service network address in the virtual service session request with the virtual service network address in each packet forwarding policy; (b2) comparing by the network node the client network address in the virtual service session request with the client network address in each packet forwarding policy; and (c1) in response to finding the match between the virtual service network address in the virtual service session request and the given virtual service network address in the given packet forwarding policy, and in response to finding a match between the client network address in the virtual service session request and the given client network address in the given packet forwarding policy, determining the given destination in the given packet forwarding policy by the network node.

System and computer program products corresponding to the above-summarized methods are also described and claimed herein.

According to another embodiment of the present invention, a method for providing forwarding policies in a virtual service network, the virtual service network comprising a network node and a pool of service load balancers serving a virtual service associated with a virtual service network address, comprising: (a) receiving a virtual service session request from a client device by the network node, the virtual service session request comprising a client device network address for the client device and the virtual service network address for the virtual service served by the pool of service load balancers, wherein the network node comprises a plurality of packet forwarding policies, each packet forwarding policy comprising a client network address and a virtual service network address associated with a destination; (b) comparing by the network node the virtual service network address in the virtual service session request with a first virtual service network address in a first packet forwarding policy of the plurality of packet forwarding policies, and comparing the client device network address in the virtual service session request with a first client network address in the first packet forwarding policy; (c) in response to determining that the virtual service network address in the virtual service session request matches the first virtual service network address, and determining that the client device network address in the virtual service session request does not match the first client network address, determining by the network node that the first packet forwarding policy does not apply to the virtual service session request; (d) in response to determining that the first packet forwarding policy does not apply, comparing by the network node the virtual service network address in the virtual service session request with a second virtual service network address in a second packet forwarding policy of the plurality of packet forwarding policies, and comparing the client device network address in the virtual service session request with a second client network address in the second packet forwarding policy; (e) in response to determining that the virtual service network address in the virtual service session request matches the second virtual service network address, and determining that the client device network address in the virtual service session request matches the second client network address, determining by the network node that the second packet forwarding policy applies to the virtual service session request; (f) in response to determining that the second packet forwarding policy applies, determining a given destination in the second packet forwarding policy by the network node; and (g) sending the virtual service session request to a service load balancer in the pool of service load balancers associated with the given destination, wherein the service load balancer establishes a virtual service session with the client device.

DETAILED DESCRIPTION OF THE INVENTION

Figure 1:
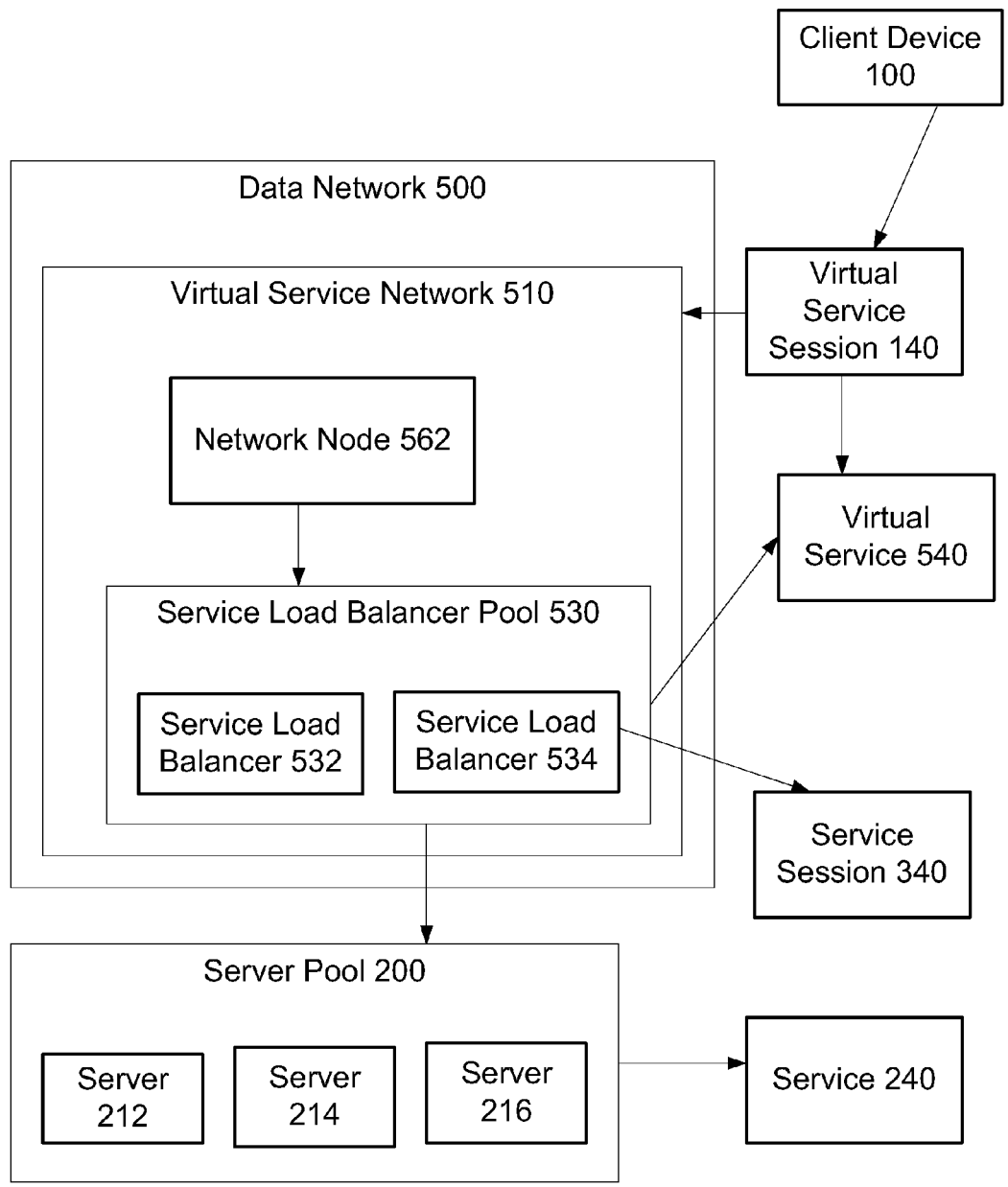
FIG. 1 illustrates a virtual service network for a service according to an embodiment of the present invention.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a virtual service network for a service according to an embodiment of the present invention. Virtual service network 510 includes a network node 562 and a service load balancer pool 530, which includes, in one embodiment, a plurality of service load balancers 532, 534. Network node 562 and service load balancer pool 530 are connected in virtual service network 510 such that network node 562 can forward packets to service load balancers 532-534 and vice versa.

In one embodiment, virtual service network 510 is configured over a data network 500. In this embodiment, network node 562 and service load balancers 532-534 are a part of data network 500. In one embodiment, network node 562 connects directly to service load balancers 532-534 and forwards data packets directly to service load balancers 532-534. In one embodiment, network node 562 forwards data packets through one or more network elements (not shown) in data network 500.

In one embodiment, service load balancers 532-534 send data packets to network node 562 through data network 500, using one or more network elements in data network 500 if necessary.

In one embodiment, data network 500 includes an Internet Protocol (IP) network, a corporate data network, a regional corporate data network, an Internet service provider network, a residential data network, a wired network such as Ethernet, a wireless network such as a WiFi network, or a cellular network. In one embodiment, data network 500 resides in a data center, or connects to a network or application network cloud.

In one embodiment, network node 562 includes, in addition to that described later in this specification, the functionality of a network switch, an Ethernet switch, an IP router, an ATM switch, a stackable switch, a broadband remote access system (BRAS), a cable head-end, a mobile network gateway, a home agent gateway (HA-Gateway), a PDSN, a GGSN, a broadband gateway, a VPN gateway, a firewall, or a networking device capable of forwarding packets in data network 500.

In some embodiments, service load balancer 534 includes functionality of a server load balancer, an application delivery controller, a service delivery platform, a traffic manager, a security gateway, a component of a firewall system, a component of a virtual private network (VPN), a load balancer for video servers, a gateway to distribute load to one or more servers, or a gateway performing network address translation (NAT).

Service load balancer pool 530 connects to server pool 200, which in an embodiment includes a plurality of servers 212, 214, 216. Servers 212-216 of server pool 200 serves service 240. Service load balancers 532-534 of service load balancer pool 530 serves service 240 as virtual service 540.

In some embodiments, server 212 includes functionality of a Web server, a file server, a video server, a database server, an application server, a voice system, a conferencing server, a media gateway, a media center, an app server or a network server providing a network or application service to client device 100 using a Web protocol.

In some embodiments, service 240 includes a Web service, a HTTP service, a FTP service, a file transfer service, a video or audio streaming service, an app download service, an advertisement service, an on-line game service, a document access service, a conferencing service, a file sharing service, a group collaboration service, a database access service, an on-line transaction service, a Web browsing service, a VOIP service, a notification service, a messaging service, or an Internet data communication service.

Each service load balancer, for example service load balancer 532, can exchange data packets to one or more servers in server pool 200.

Client device 100 is a computing device connecting to virtual service network 510. In one embodiment, in order to utilize service 240, client device 100 establishes a virtual service session 140 for virtual service 540 with service load balancer pool 530 through virtual service network 510. Service load balancer pool 530 establishes service session 340 with server pool 200 and relays data packets between virtual service session 140 and service session 340. In this embodiment, server pool 200 provides the service 240 to client device 100. In some embodiments, client device 100 is a personal computer, a laptop computer, a desktop computer, a smartphone, a feature phone, a tablet computer, an e-reader, an end-use networked device, a server computer, a service proxy computer, a service gateway, a business computer, a server computer, or a computer requesting service 240.

Figure 2A:
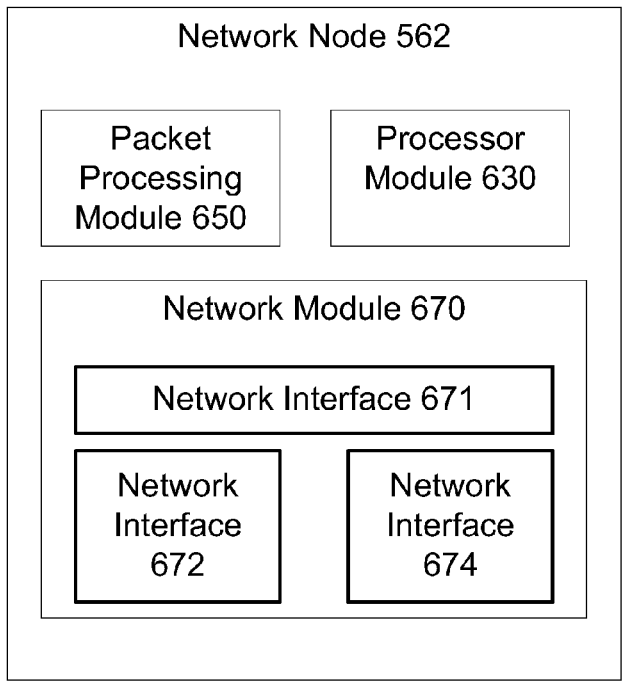
FIG. 2a illustrates a component view of network node according to an embodiment of the present invention.
Figure 2B:
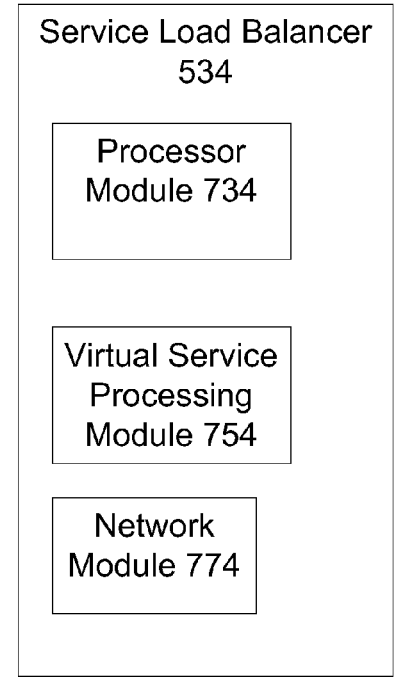
FIG. 2b illustrates a component view of service load balancer according to an embodiment of the present invention.
Figure 2C:
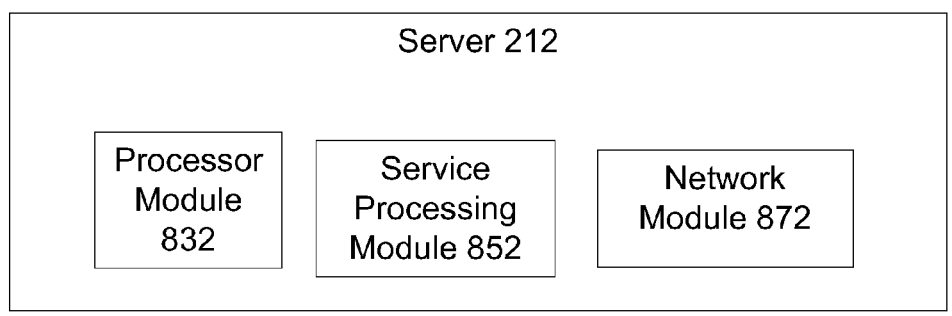
FIG. 2c illustrates a component view of server according to an embodiment of the present invention.

FIGS. 2a-2c illustrate components of network node 562, service load balancer 534, and server 212 according to an embodiment of the present invention.

In one embodiment illustrated in FIG. 2a, network node 562 includes processor module 630, packet processing module 650, and network module 670. In one embodiment, processor module 630 includes one or more processors and a computer readable medium storing programming instructions. In one embodiment, processor module 630 includes storage such as random accessible memory (RAM). In one embodiment, packet processing module 650 includes a processor or a network processor capable of processing data packets. In one embodiment, packet processing module 650 is part of processor module 630. In one embodiment, packet processing module 650 is a physical card or module housing a network processor. In one embodiment packet processing module 650 includes storage such as random access memory (RAM), context addressable memory (CAM), tertiary CAM (TCAM), static random access memory (SRAM) or other memory component. In one embodiment, packet processing module 650 includes a plurality of programming instructions. In one embodiment, network module 670 interacts with data network 500 and virtual service network 510 to transmit and receive data packets. In one embodiment, network module 670 includes a plurality of network interfaces such as network interface 671, network interface 672 and network interface 674. Each of the network interfaces connect to another network component. For example, in one embodiment, network interface 671 connects to client device 100; network interface 672 connects to service load balancer 532; and network interface 674 connects to service load balancer 534. In one embodiment, network interface 671 connects to client device 100 and service load balancer pool 530. In one embodiment, network interface 671 is an Ethernet, Gigabit Ethernet, 10-Gigabit Ethernet, ATM, MPLS, wireless network, or optical network interface.

FIG. 2b illustrates a service load balancer such as service load balancer 534 according to an embodiment of the present invention. In one embodiment, service load balancer 534 includes processor module 734, virtual service processing module 754 and network module 774. Network module 774 interacts with data network 500 and virtual service network 510 to transmit and receive data packets. In one embodiment, network module 774 exchanges data packets with network node 562 and server pool 200. Network module 774 includes a network interface card or network interface module connecting to data network 500 and virtual service network 510. In one embodiment, processor module 734 includes a processor and computer readable medium storing programming instructions. In one embodiment, virtual service processing module 754 includes a physical hardware comprising a processor or a network processor, a memory module such as RAM. In one embodiment, virtual service processing module 754 is included in processor module 734. In one embodiment, virtual service processing module 754 includes storage storing programming instructions.

FIG. 2c illustrates a server, such as server 212, according to an embodiment of the present invention. In one embodiment, server 212 includes processor module 832, service processing module 852 and network module 872. Network module 872 interacts with virtual service network 510 to transmit or receive data packets. In one embodiment, network module 872 exchanges data packets with service load balancer pool 530. Network module 872 includes a network interface card or network interface module connecting to data network 510 or virtual service network 500. In one embodiment, processor module 832 includes a processor and computer readable medium storing programming instructions. In one embodiment, service processing module 852 includes a physical hardware comprising a processor or a network processor, a memory module such as RAM. In one embodiment, service processing module 852 is included in processor module 832. In one embodiment, service processing module 852 includes storage storing programming instructions executed by server 212.

Figure 3:
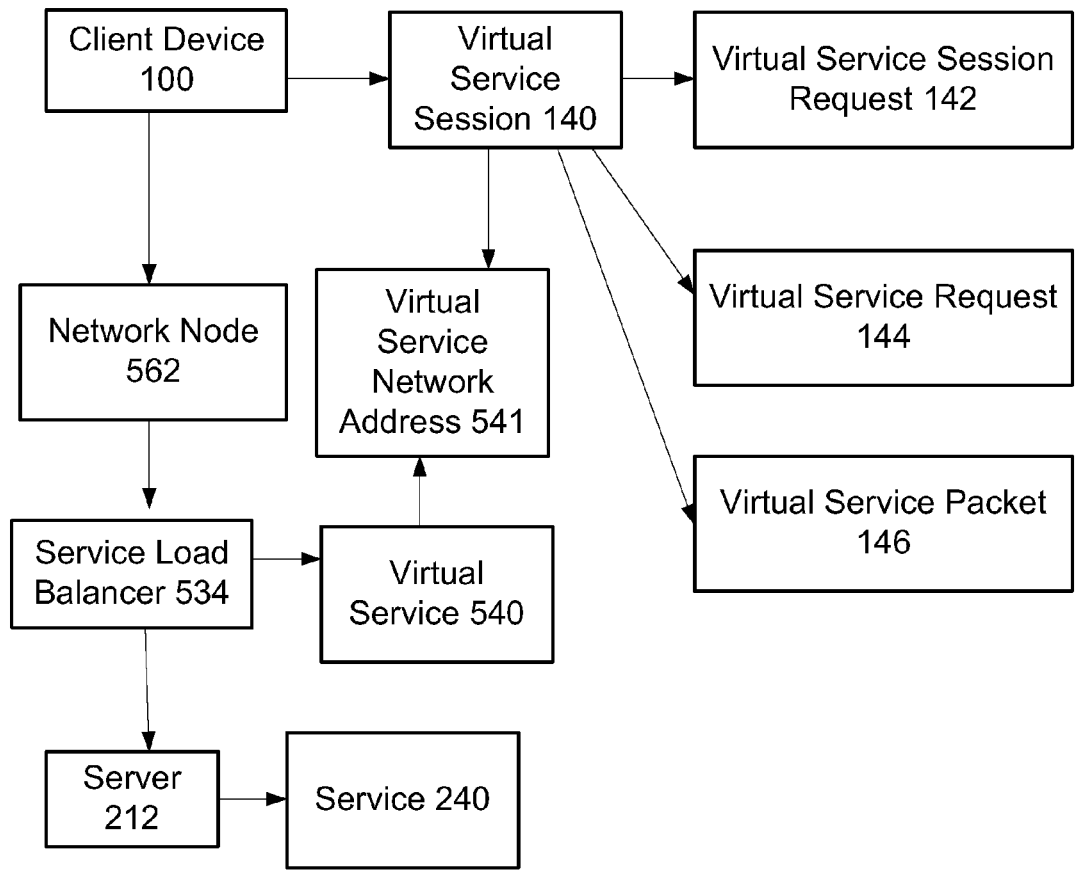
FIG. 3 illustrates a virtual service session according to an embodiment of the present invention.

FIG. 3 illustrates a session between client device and a server according to an embodiment of the present invention. In one embodiment, client device 100 uses service 240 by conducting virtual service session 140 using virtual service 540. In one embodiment, virtual service session 140 is a IP session, a UDP session, a TCP session, a SIP session, an ICMP session, a GRE session, a RTSP session, an SSL session, a HTTPS session, or a HTTP session. In one embodiment, virtual service 540 includes a virtual service network address 541, such as an IP network address. In one embodiment, the virtual service network address 541 is shared among the service load balancers in the service load balancer pool 530. In one embodiment, virtual service network address 541 includes a transport layer identity such as a port number, a TCP port, a UDP port. In one embodiment, client device 100 sends a virtual service session request 142, such as a TCP session request data packet, to network node 562. Virtual service session request 142 includes virtual service network address 541. In one embodiment, network node 562 determines that virtual service session request 142 is to be sent to service load balancer 534, based on virtual service network address 541. Service load balancer 534 establishes virtual service session 140 with client device 100.

After establishing virtual service session 140, client device 100 sends a virtual service request 144 through virtual service session 140 to service load balancer 534. Service load balancer 534 determines that virtual service request 144 is to be relayed to server 212. Subsequently client device 100 exchanges virtual service data packet 146 with server 212 via service load balancer 534.

Figure 3A:
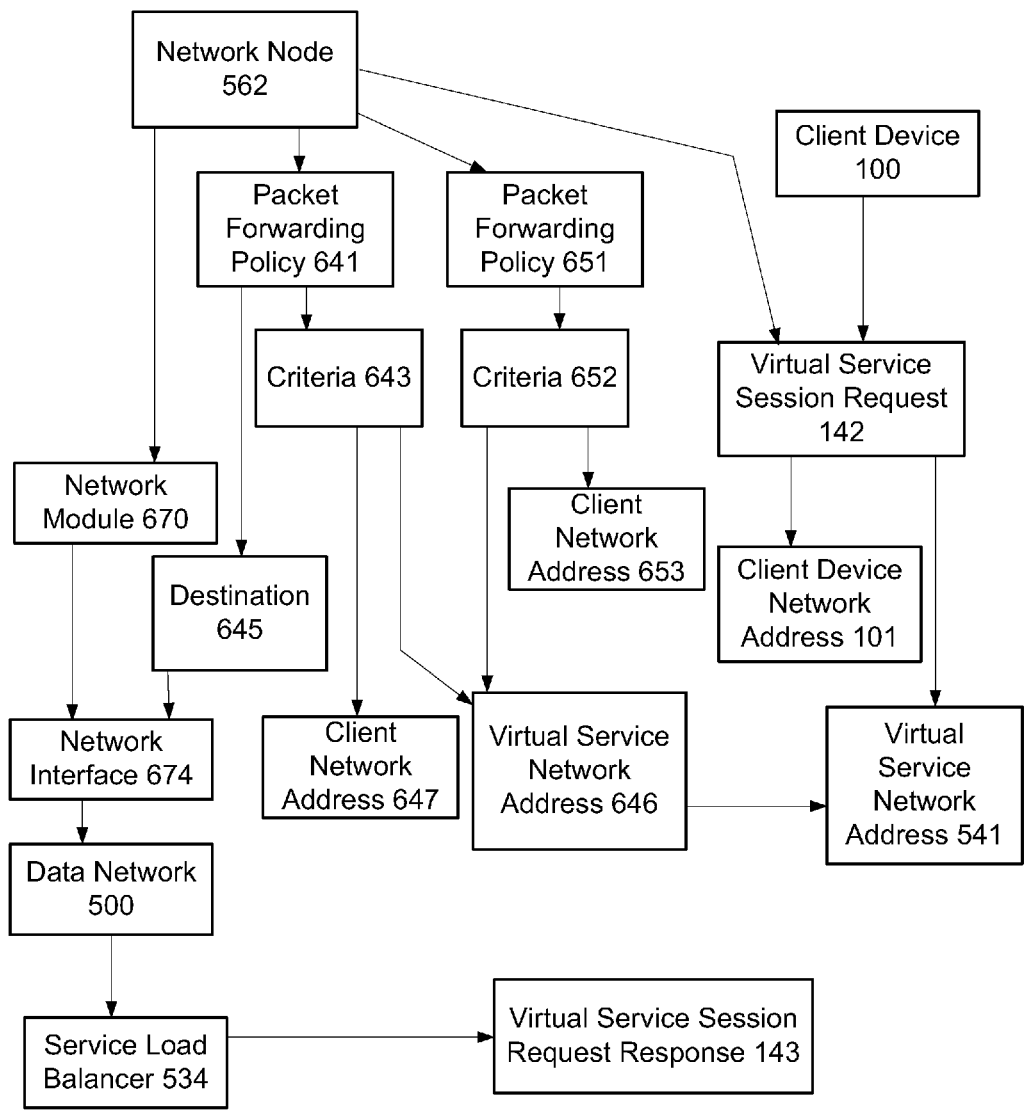
FIG. 3a illustrates processing of a virtual service session request according to an embodiment of the present invention.

FIG. 3a illustrates processing of virtual service session request 142 according to an embodiment of the present invention. Client device 100 sends virtual service session request 142 to network node 562. In one embodiment, virtual service session request 142 data packet includes virtual service network address 541, and client network address 101 (also referred to herein as client device network address). In one client network address 101 includes an IP address of client device 100, and optionally a transport layer address. Network node 562 selects service load balancer 534, based on a packet forwarding policy 641, and forwards virtual service session request 142 to service load balancer 534. Packet forwarding policy 641 includes criteria 643 and destination 645. Criteria 643 contain matching information for network node 562 to match against virtual service session request 142. Destination 645 includes information to transmit virtual service session request 142. In one embodiment, destination 645 indicates using network interface 674 to transmit virtual service session request 142. Network node 562 informs network module 670 to transmit virtual service session request 142 using network interface 674. In one embodiment, network interface 674 directly connects to service load balancer 534 and service load balancer 534 receives virtual service session request 142. In one embodiment, network interface 674 connects to service load balancer 534 via data network 500 and service load balancer 534 receives virtual service session request 142 via data network 500.

Network node 562 compares criteria 643 against virtual service session request 142. In one embodiment, network node 562 retrieves virtual service network address 541 from virtual service session request 142. In one embodiment, criteria 643 include virtual service network address 646. Network node 562 compares virtual service network address 541 with virtual service network address 646. In one embodiment, virtual service network address 646 includes virtual service network address 541 and network node 562 finds a match between virtual service network address 541 and virtual service network address 646. In response to finding a match between virtual service network address 541 and virtual service network address 646, the network node 562 applies the packet forwarding policy 641 to the virtual service session request 142 by informing the network module 670 to transmit the virtual service session request 142 using the network interface 674 indicated by destination 645.

In one embodiment, virtual service network address 646 includes a transport layer address such as TCP port number, UDP port number or other transport layer information. Network node 562 retrieves transport layer address from virtual service network address 541 and compares with virtual service network address 646. In one embodiment, network node 562 finds a match of the transport layer addresses, network node 562 determines that packet forwarding policy 641 is to be applied to virtual service session request 142. In one embodiment, virtual service network address 646 includes a range of network addresses. In finding that virtual service network address 541 is included in the range of network addresses, network node 562 determines there is a match. In one embodiment, virtual service network address 646 includes a range of transport layer addresses. In finding that transport layer address of virtual service network address 541 is included in the range of transport layer addresses, network node 562 determines there is a match.

In one embodiment, criteria 643 include client network address 647. Network node 562 obtains client device network address 101 from virtual service session request 142 and compares client network address 647 with client device network address 101. If there is a match, network node 562 determines packet forwarding policy 641 is applicable. In one embodiment, client network address 647 includes a range of network addresses. In finding that client device network address 101 is included in the range of network addresses, network node 562 determines there is a match.

In one embodiment, network node 562 further includes another packet forwarding policy 651. Packet forwarding policy 651 includes criteria 652, which includes a client network address 653 different from client network address 647 and the same virtual service network address 646 as packet forwarding policy 641. Network node 562 obtains virtual service network address 541 and client device network address 101 from virtual service session request 142. In one embodiment, network node 562 first determines whether packet forwarding policy 651 applies to virtual service session request 142. Network node 562 compares client network address 653 in packet forwarding policy 651 with client device network address 101, and compares virtual service network address 646 in packet forwarding policy 651 with virtual service network address 541. In response to determining that there is no match between the client network address 653 and client device network address 101, the network node 562 determines that packet forwarding policy 651 does not apply. In one embodiment client network address 653 includes a range of network addresses. In finding that client device network address 101 is not included in the range of network addresses, network node 562 determines there is no match.

Network node 562 then determines whether a different packet forwarding policy applies. In one embodiment, after determining that packet forwarding policy 651 does not apply, network node 562 determines whether packet forwarding policy 641 applies. Network node compares client network address 647 in packet forwarding policy 641 with client device network address 101, and compares virtual service network address 646 in packet forwarding policy 641 with virtual service network address 541. In response to finding a match between client network address 647 and client network address 101 and a match between the virtual service network address 646 and virtual service network address 541, network node 562 determines packet forwarding policy 641 is applicable.

Upon receiving virtual service session request 142, service load balancer 534 processes the virtual service session request 142 and replies with a virtual service session request response 143, comprising one or more data packets to be transmitted to client device 100. A process to send data packet 143 will be discussed in a later illustration.

In one embodiment, destination 645 includes a modification procedure prior to transmission. Network node 562 applies the modification procedure in destination 645 prior to informing network interface 674. In one embodiment, destination 645 indicates a IP tunneling modification, a VLAN modification, a MPLS modification, a L2TP tunnel, a IP-in-IP tunnel, a IPv6-v4 tunnel modification, a IPSec modification, a packet header modification, a packet payload modification, or other modification procedure related to network interface 674.

Figure 3B:
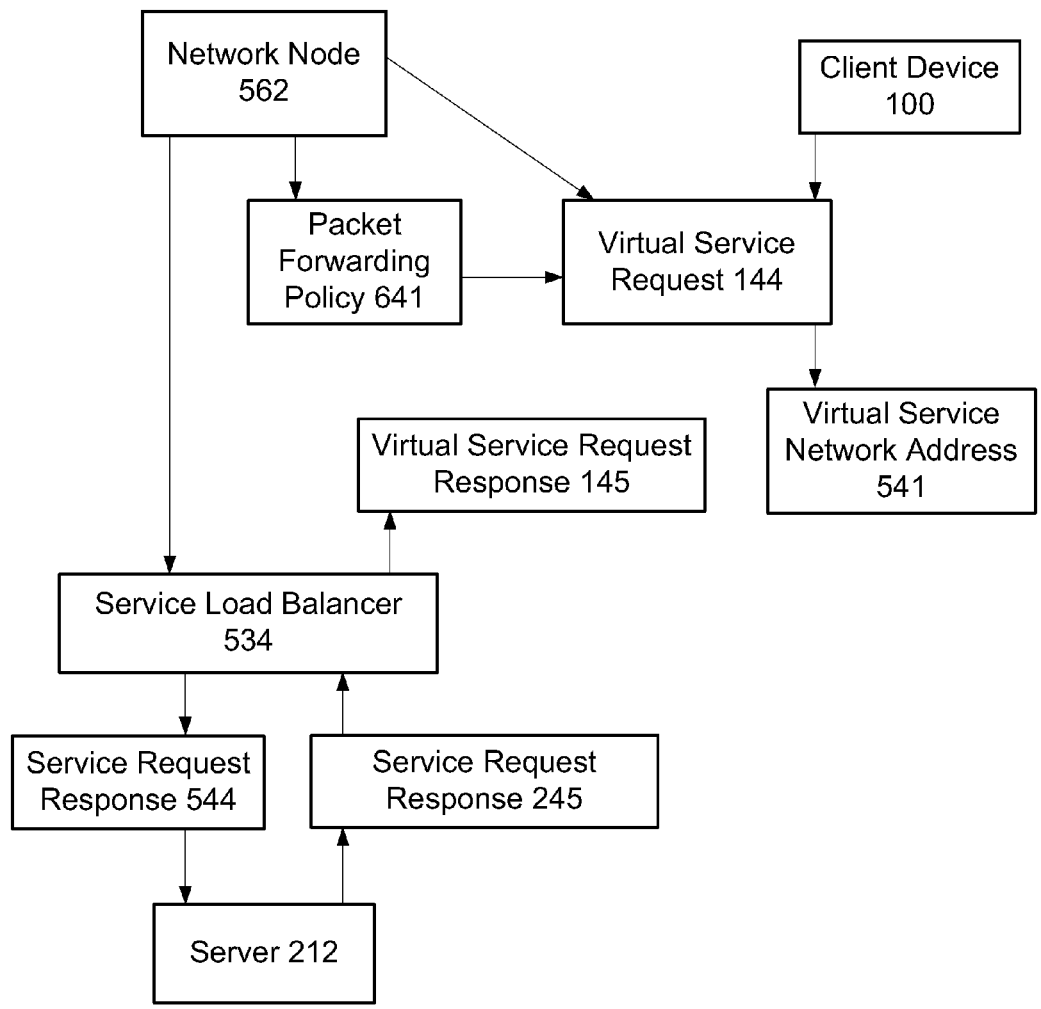
FIG. 3b illustrates processing of a virtual service request according to an embodiment of the present invention.

FIG. 3b illustrates processing of virtual service request 144 according to an embodiment of the present invention. Client device 100 sends virtual service request 144 data packet to network node 562, where the virtual service request 144 includes a virtual service network address 541. In one embodiment, network node 562 processes virtual service request 144 using a similar process illustrated in FIG. 3a, matching the criteria from packet forwarding policy 641 with virtual service request 144 having virtual service network address 541. Network node 562 sends virtual service request 144 to service load balancer 534 according to the application of the matching packet forwarding policy 641.

Service load balancer 534 receives and processes virtual service request 144. Service load balancer 534 selects server 212 to service virtual service request 144 and sends the virtual service request 144 to the server 212. The selection of server 212 is known to those skilled in the art. Any and all such selection process is considered as a part of an embodiment of the present invention and is not described in this specification. Server 212 responds to the virtual service request 144 with a service request response 245 and sends the service request response 245 to service load balancer 534. Service load balancer 534 creates virtual service request response 544 and sends virtual service request response 544 to client device 100. An embodiment to send virtual service request 544 from service load balancer 534 to client device 100 will be described in a later illustration in this specification.

Figure 3C:
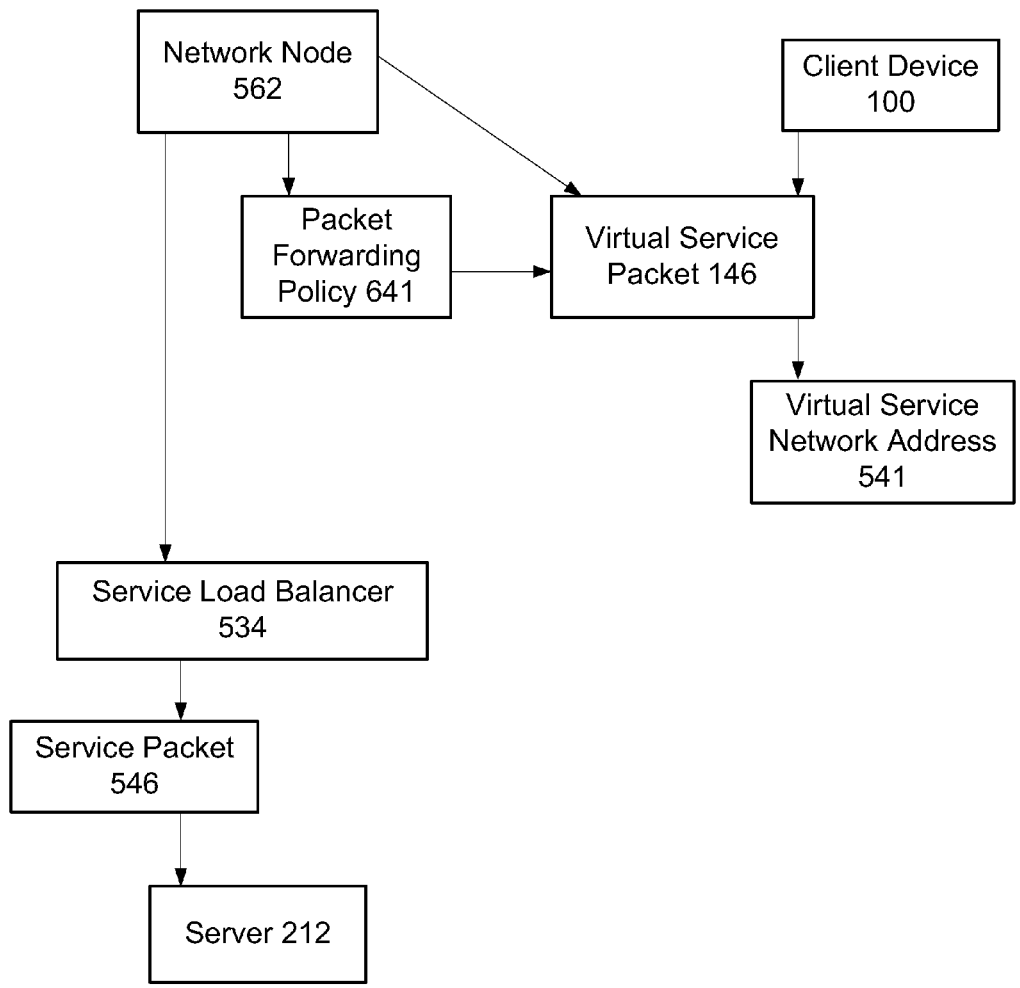
FIG. 3c illustrates processing of a virtual service data packet according to an embodiment of the present invention.

FIG. 3c illustrates processing of virtual service data packet 146 according to an embodiment of the present invention. Client device 100 sends virtual service data packet 146 to network node 562, where the virtual service data packet 146 includes a virtual service network address 541. In one embodiment, network node 562 processes virtual service data packet 146 in a similar process illustrated in FIG. 3a, matching the criteria from packet forwarding policy 641 with virtual service data packet 146 having virtual service network address 541. Network node 562 sends virtual service data packet 146 to service load balancer 534. Service load balancer 534 generates service packet 546 using virtual service data packet 146, and sends service packet 546 to server 212. The process of generating service packet 546 using virtual service data packet 146 is known to those skilled in the art and is not described in this specification.

Figure 4:
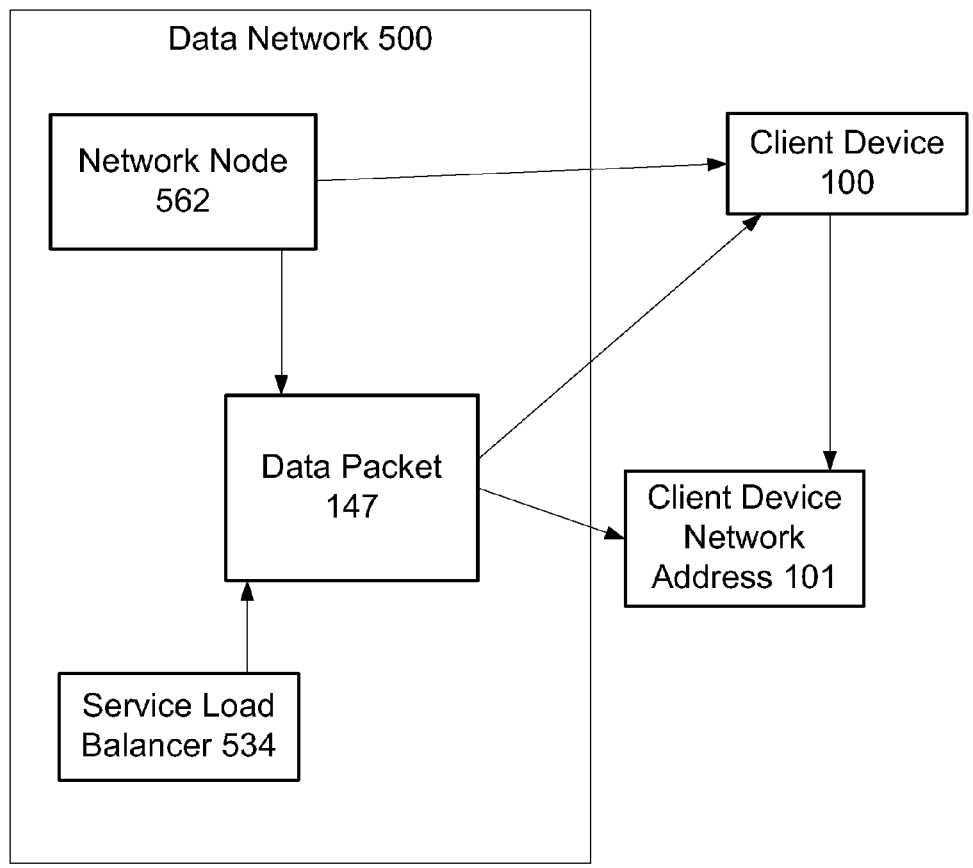
FIG. 4 illustrates processing of a data packet from service load balancer to client device according to an embodiment of the present invention.

FIG. 4 illustrates a process to forward a data packet from service load balancer 534 to client device 100 according to an embodiment of the present invention. In one embodiment, service load balancer 534 sends a data packet 147 of virtual service session 140 to network node 562. In one embodiment, data packet 147 may be virtual service request response 544 or virtual service request response 245. Data packet 147 includes client device network address 101 of client device 100 as a destination for data packet 147. Service load balancer 534 sends data packet 147 through data network 500 to network node 562, and network node 562 receives data packet 147 from data network 500. In one embodiment, data packet 147 traverses through virtual service network 510 before it is received by network node 562.

Network node 562 retrieves destination client device network address 101 from data packet 147, and determines that data packet 147 is to be sent to client device 100, based on the retrieved client device network address 101.

Figure 5:
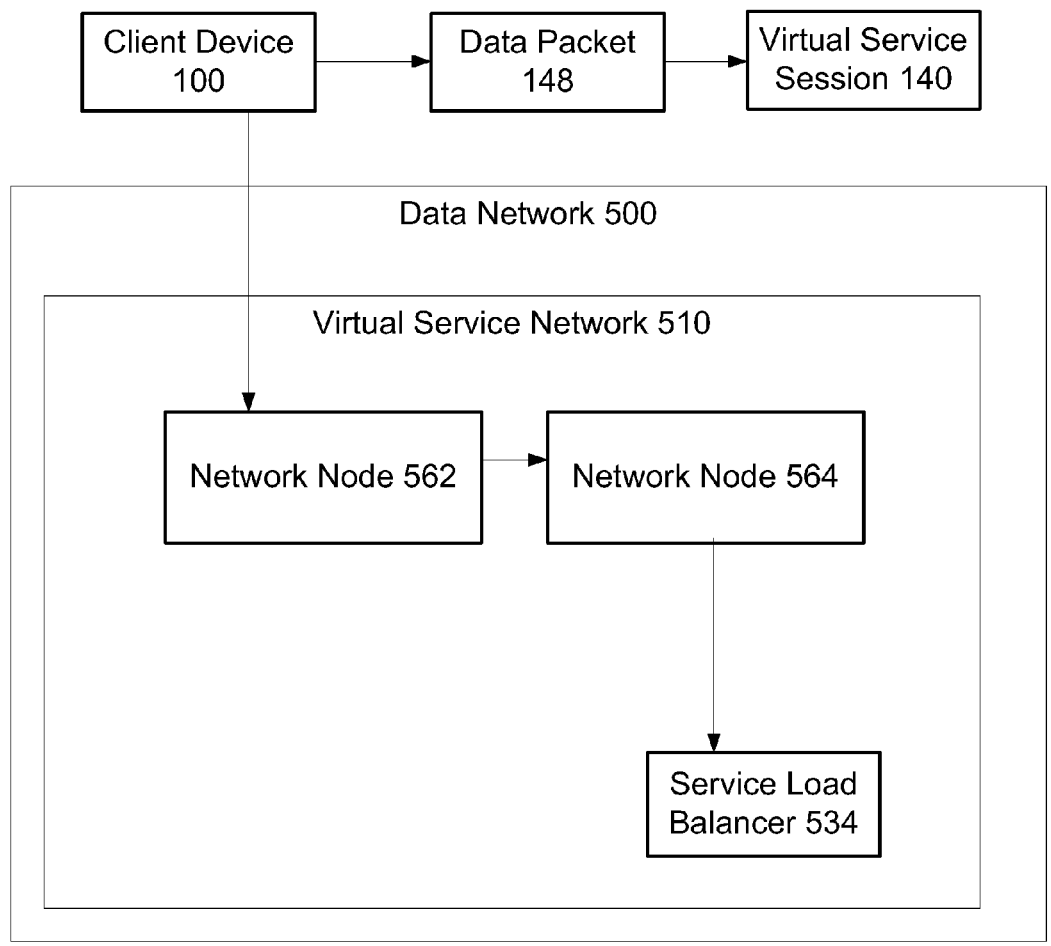
FIG. 5 illustrates a via network node according to an embodiment of the present invention.
Figure 5A:
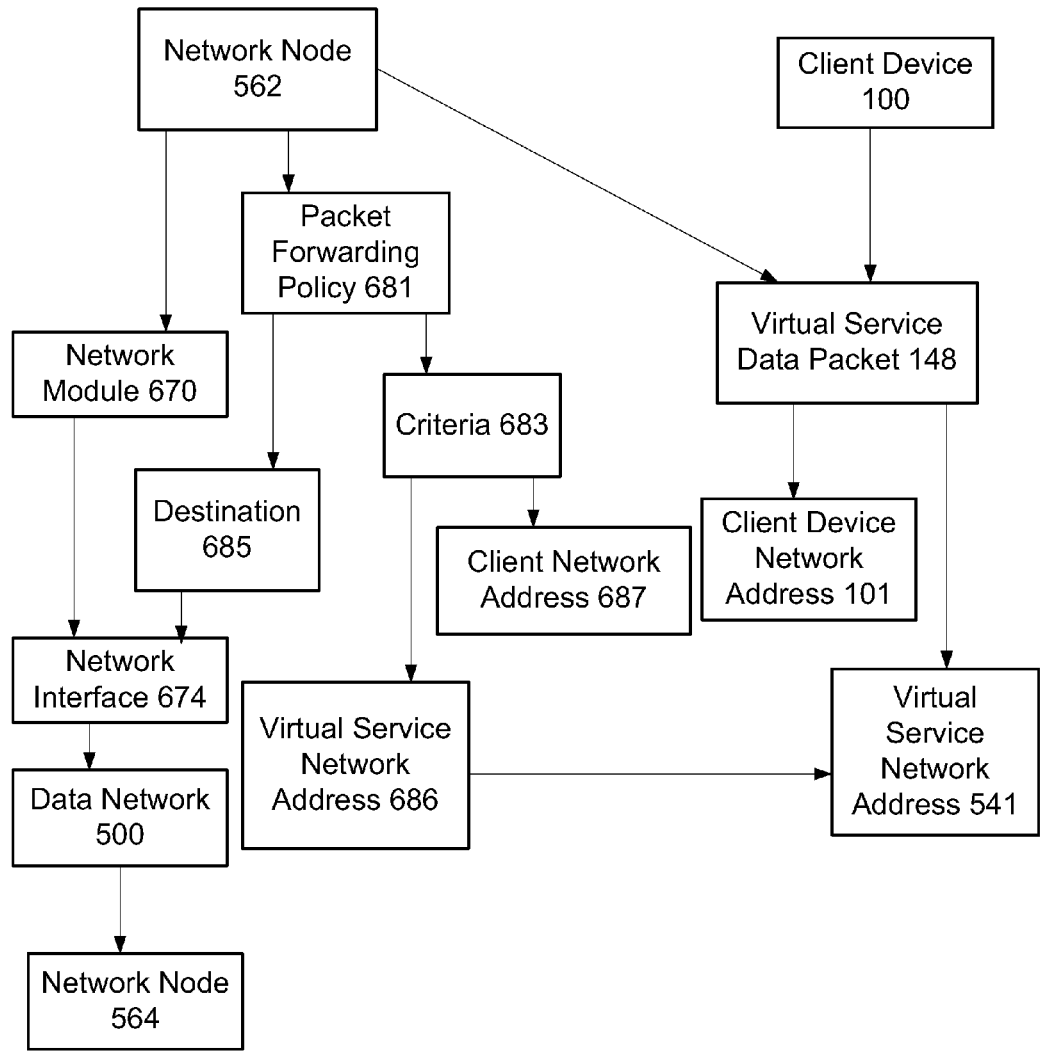
FIG. 5a illustrates forwarding a virtual service data packet to a via network node according to an embodiment of the present invention.

In one embodiment illustrated in FIG. 5, virtual service network 510 includes a network node 564 connected with network node 562 and service load balancer 534. Network node 562 connects to client device 100. Network node 562 receives virtual service data packet 148 of virtual service session 140 from client device 100. Network node 562 selects network node 564 to receive virtual service data packet 148 from network node 562. FIG. 5a illustrates a process for network node 562 to select network node 564 according to an embodiment of the present invention. Network node 564 receives and processes virtual service data packet 148. Network node 564 sends virtual service data packet 148 to service load balancer 534 according to an embodiment process illustrated in FIGS. 3, 3a-3c.

FIG. 5a illustrates a process of network node 562 to send a virtual service data packet 148 from client device 100 to network node 564 according to an embodiment of the present invention. Client device 100 sends virtual service data packet 148 to network node 562. In one embodiment, data packet 148 includes virtual service network address 541, and client network address 101. Network node 562 selects network node 564, based on a packet forwarding policy 681, and forwards data packet 148 to network node 564. Packet forwarding policy 681 includes criteria 683 and destination 685. Criteria 683 contain matching information for network node 562 to compare against data packet 148. Destination 685 indicates information to transmit data packet 148. In one embodiment, destination 685 indicates network interface 674 is to be used to transmit data packet 148. Network node 562 informs network module 670 to transmit data packet 148 using network interface 674. In one embodiment, network interface 674 directly connects to network node 564 and network node 564 receives data packet 148. In one embodiment, network interface 674 connects to network node 564 via data network 500 and network node 564 receives data packet 148 via data network 500.

Network node 562 matches criteria 683 against data packet 148. In one embodiment, network node 562 retrieves virtual service network address 541 from data packet 148. In one embodiment, criteria 683 include virtual service network address 686. Network node 562 matches virtual service network address 541 with virtual service network address 686. In one embodiment, virtual service network address 686 includes virtual service network address 541 and network node 562 finds a match between virtual service network address 541 and virtual service network address 686.

In one embodiment, virtual service network address 686 includes a transport layer address such as TCP port number, UDP port number or other transport layer information. Network node 562 retrieves transport layer address from data packet 148 and compares the transport layer address with virtual service network address 686. In one embodiment, network node 562 finds a match of the transport layer addresses, network node 562 determines that packet forwarding policy 681 is to be applied to data packet 148. In one embodiment, virtual service network address 686 includes a range of network addresses. In finding that virtual service network address 541 is included in the range of network addresses, network node 562 determines there is a match. In one embodiment, virtual service network address 686 includes a range transport layer addresses. In finding that the transport layer address of data packet 148 is included in the range of transport layer addresses, network node 562 determines there is a match.

In one embodiment, criteria 683 include client network address 687. Network node 562 obtains client device network address 101 from data packet 148 and compares client network address 687 with client device network address 101. If there is a match, network node 562 determines packet forwarding policy 681 is applicable. In one embodiment, client network address 687 includes a range of network addresses. In finding that client device network address 101 is included in the range of network addresses, network node 562 determines there is a match.

In one embodiment, destination 685 indicates a modification process prior to transmission. Network node 562 applies the modification in destination 685 prior to informing network interface 674. In one embodiment, destination 645 indicates an IP tunneling modification, a VLAN modification, a MPLS modification, a L2TP tunnel, a IP-in-IP tunnel, a IPv6-v4 tunnel modification, a IPSec modification, a packet header modification, a packet payload modification, a layer 2 over layer 2 tunnel modification, a layer 3 over layer 2 tunnel modification, a layer 3 over layer 3 tunnel modification, or other modification related to network interface 674.

Figure 6:
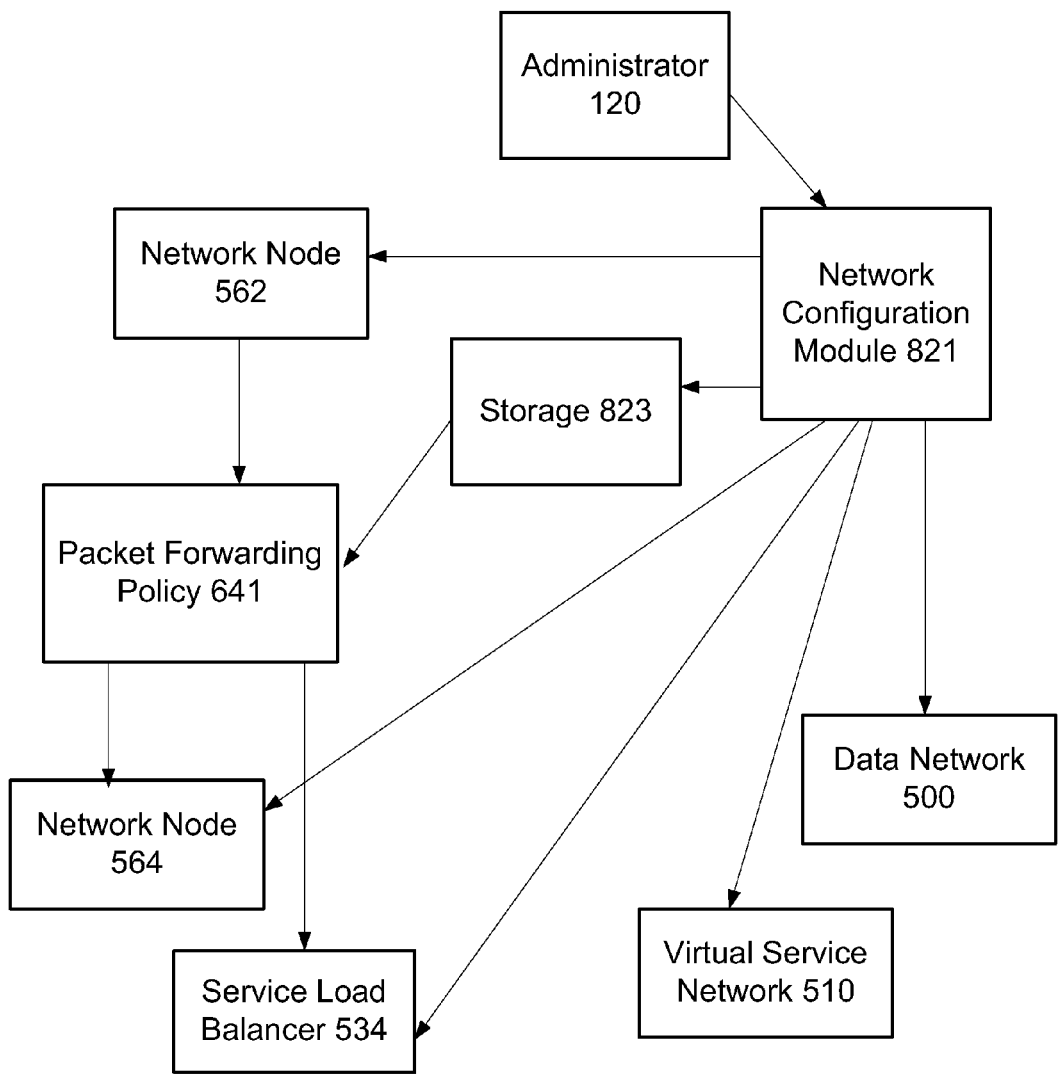
FIG. 6 illustrates a network node configuration according to an embodiment of the present invention.

FIG. 6 illustrates a process to configure a network node with a packet forwarding policy according to an embodiment of the present invention. Network configuration module 821 includes packet forwarding policy 641 which contains a policy to forward a data packet to service load balancer 534 or network node 564. Network configuration module 821 sends packet forwarding policy 641 to network node 562. In one embodiment, network configuration module 821 is a network management system. In one embodiment, network configuration module 821 is a software module within a service load balancer, such as service load balancer 534. In one embodiment, network configuration module 821 is an administrative computing device, wherein a network administrative user provides packet forwarding policy 641 to network configuration module 821. In one embodiment network configuration module 821 connects to storage 823 wherein storage 823 includes packet forwarding policy 641. Network configuration module 821 retrieves packet forwarding policy 641 and sends to network node 562. In one embodiment, storage 823 includes other packet forwarding policies.

In one embodiment, network configuration module 821 receives packet forwarding policy 641 from administrator 120, and stores packet forwarding policy 641 into storage 823.

In one embodiment, network configuration module 821 connects to service load balancer 534 and detects a change to service load balancer 534, and in response, network configuration module 821 generates packet forwarding policy 641. In one embodiment, a change can be due to a change to virtual service 540 of service load balancer 534, or availability of service load balancer 534. In one embodiment, service load balancer 534 sends packet forwarding policy 641 to network configuration module 821.

In one embodiment, network configuration module 821 connects to network node 564 and detects a change to network node 564, and in response, network configuration module 821 generates packet forwarding policy 641.

In one embodiment, network configuration module 821 connects to virtual service network 510 and data network 500. Network configuration module 821 detects a change to virtual service network 510 or data network 500. In response, network configuration module 821 generates packet forwarding policy 641.

In one embodiment, network configuration module 821 detects a change in network node 562 and generates packet forwarding policy 641.

In one embodiment, network configuration module 821 instructs network node 562 to remove packet forwarding policy 641. In one embodiment, network configuration module 821 detects a change in network node 564, service load balancer 534, data network 500, virtual service network 510, or network node 562 and determines packet forwarding policy 641 is to be removed. In one embodiment, network configuration module 821 removes packet forwarding policy 641 from storage 823.

In one embodiment, network configuration module 821 receives a command from administrator 120 to remove packet forwarding policy 641. In one embodiment, network configuration module 821 receives a command from service load balancer 534 to remove packet forwarding policy 641.

Figure 7:
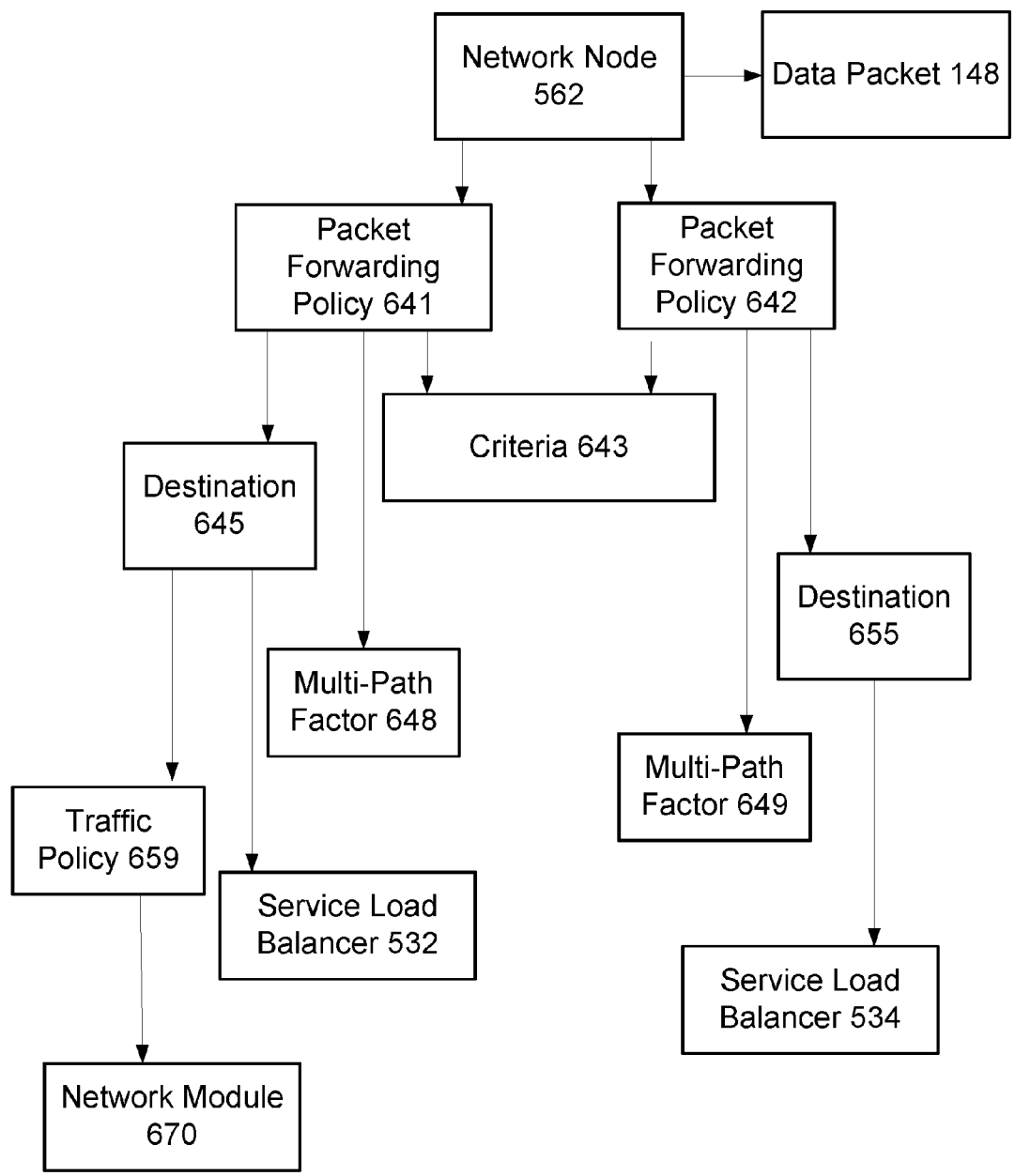
FIG. 7 illustrates packet forwarding policies with other information according to an embodiment of the present invention.

FIG. 7 illustrates several embodiments of different packet forwarding policies according to an embodiment of the present invention. In FIG. 7, network node 562 includes packet forwarding policy 641 and packet forwarding policy 642. Packet forwarding policy 641 and packet forwarding policy 642 include the same criteria 643. Packet forwarding policy 641 includes destination 645 that is different from destination 655 in packet forwarding policy 642. In one embodiment, destination 645 is for service load balancer 532 or a network node (not shown), whereas destination 655 is for service load balancer 534, which is different from service load balancer 532.

In one embodiment, network node 562 receives data packet 148 from client device 100 and matches information in data packet 148 with criteria 643. Network node 562 finds both packet forwarding policy 641 and packet forwarding policy 642 applicable. Network node 562 selects packet forwarding policy 641 based on additional information. In one embodiment, packet forwarding policy 641 includes multi-path factor 648 while packet forwarding policy 642 includes multi-path factor 649. Network node 562 selects packet forwarding policy 641 based on multi-path factor 648 and traffic policy 659. In one embodiment, multi-path factor 648 indicates a primary path while multi-path factor 649 indicates a secondary path. Network node 562 selects packet forwarding policy 641. In one embodiment, multi-path factor 648 includes a status indicating if service load balancer 532 is available. If multi-path factor 648 status indicates service load balancer 532 is available and multi-path factor 649 status indicates service load balancer 534 is not available, network node 562 selects packet forwarding policy 641.

In one embodiment, packet forwarding policy 641 includes traffic policy 659 such as traffic shaping, traffic management, quality of service, bandwidth management, packet access control or queuing parameters. Network node 562 applies traffic policy 659 or instructs network module 670 to apply traffic policy 659.

Figure 8:
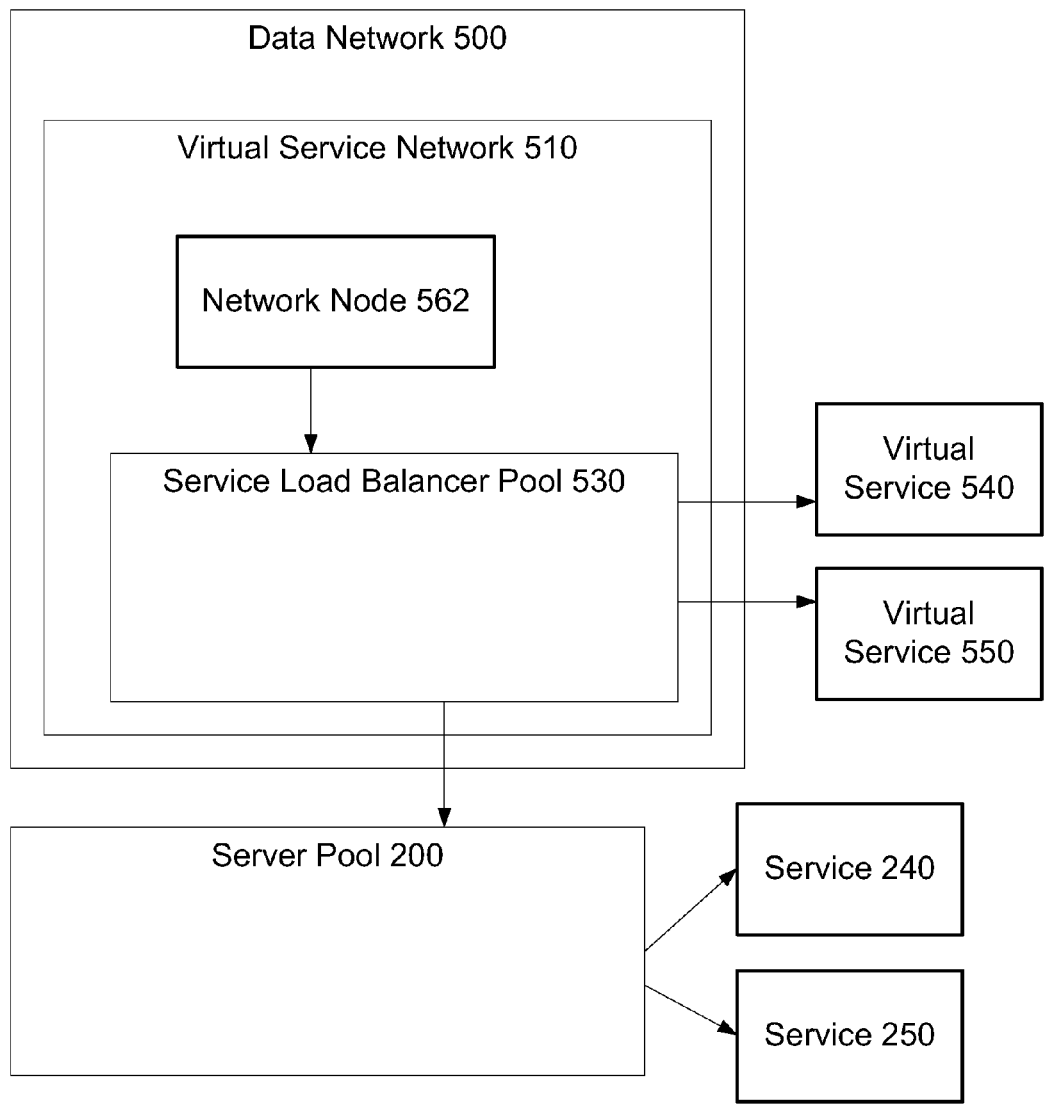
FIG. 8 illustrates a virtual service network supporting multiple services according to an embodiment of the present invention.

In an embodiment illustrated in FIG. 8, server pool 200 serves service 240 and service 250. In this embodiment, service load balancer pool 530 provides virtual services 540 and 550 corresponding to service 240 and service 250 respectively. Network node 562 will include at least one packet forwarding policy for virtual service 540 and one packet forwarding policy for virtual service 550. When the network node 562 receives a data packet, the network node 562 determines whether the data packet is for virtual service 540 or virtual service 550. If the data packet is for virtual service 540, then the network node 562 processes the data packet according to the packet forwarding policies for virtual service 540. If the data packet is for virtual service 550, then the network node 562 processes the data packet according to the packet forwarding policies for virtual service 550.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing forwarding policies in a virtual service network, the virtual service network comprising a network node and a pool of service load balancers serving a virtual service associated with a virtual service network address, comprising:
   receiving a virtual service session request from a client device by the network node, the virtual service session request comprising the virtual service network address for the virtual service served by the pool of service load balancers, wherein the network node comprises a plurality of packet forwarding policies, each packet forwarding policy comprising a virtual service network address associated with a destination;
   comparing by the network node the virtual service network address in the virtual service session request with the virtual service network address in each packet forwarding policy;
   in response to finding a match between the virtual service network address in the virtual service session request and a given virtual service network address in a given packet forwarding policy, determining the given destination in the given packet forwarding policy by the network node; and
   sending the virtual service session request to a service load balancer in the pool of service load balancers associated with the given destination, wherein the service load balancer establishes a virtual service session with the client device.

2. The method of claim 1, wherein after the service load balancer establishes the virtual service session with the client device, the method further comprises:
   receiving a virtual service request from the client device through the virtual service session by the network node, the virtual service request comprising the virtual service network address for the virtual service;
   comparing by the network node the second virtual service network address in the virtual service request with the virtual service network address in each packet forwarding policy;
   in response to finding a match between the virtual service network address in the virtual service request and a second given virtual service network address in a second given packet forwarding policy, determining a second given destination in the second given packet forwarding policy by the network node; and
   sending the virtual service request to a second service load balancer associated with the second given destination by the network node.

3. The method of claim 2, further comprising:
   receiving a virtual service data packet from the client device through the virtual service session by the network node, the virtual service data packet comprising the virtual service network address for the virtual service;
   comparing by the network node the virtual service network address in the virtual service data packet with the virtual service network address in each packet forwarding policy;
   in response to finding a match between the virtual service network address in the virtual service data packet and a third given virtual service network address in a third given packet forwarding policy, determining a third given destination in the third given packet forwarding policy by the network node; and
   sending the virtual service data packet to a third service load balancer associated with the third given destination by the network node.

4. The method of claim 3, wherein the service load balancer, the second service load balancer, and the third service load balancer are the same service load balancer.

5. The method of claim 1, the method further comprises:
   receiving a data packet of the virtual service session by the network node from the service load balancer over a data network, the data packet comprising a client network address of the client device;
   retrieving the client network address from the data packet by the network node; and
   sending the data packet to the client device using the client network address by the network node.

6. The method of claim 5, wherein the data packet comprises a virtual service session request response or a virtual service request response.

7. The method of claim 1, wherein the given destination comprises a second network node, wherein the sending the virtual service session request to a service load balancer in the pool of service load balancers associated with the given destination comprises:
   sending the virtual service session request to the second network node, wherein the second network node comprises a second plurality of packet forwarding policies, each of the second plurality of packet forwarding policies comprising a second virtual service network address associated with a second destination;
   comparing by the second network node the virtual service network address in the virtual service session request with the virtual service network address in each of the second plurality of packet forwarding policies;
   in response to finding a match between the virtual service network address in the virtual service session request and a second given virtual service network address in a second given packet forwarding policy, determining a second given destination in the second given packet forwarding policy by the second network node; and
   sending the virtual service session request to the service load balancer associated with the second given destination, wherein the service load balancer establishes a virtual service session with the client device.

8. The method of claim 1, wherein the determining the given destination in the given packet forwarding policy by the network node comprises:
   finding by the network node that the virtual service network address in the virtual service session request matches a first virtual service network address in a first packet forwarding policy and a second virtual service network address in a second packet forwarding policy;
   selecting by the network node either the first packet forwarding policy or the second packet forwarding policy based on additional information comprised in the first and second packet forwarding policies; and
   determining the given destination in the selected packet forwarding policy by the network node.

9. The method of claim 8, wherein the additional information comprises one or more of the following: a multi-path factor; and a traffic policy.

10. The method of claim 8, wherein the first packet forwarding policy comprises a first destination associated with a first service load balancer in the pool of service load balancers, wherein the second packet forwarding policy comprises a second destination associated with a second service load balancer in the pool of service load balancers, wherein the first service load balancer is different from the second service load balancer, wherein the determining the given destination in the selected packet forwarding policy by the network node comprises:
 in response to selecting the first packet forwarding policy, determining the first destination associated with the first service load balancer in the first packet forwarding policy by the network node; and
 in response to selecting the second packet forwarding policy, determining the second destination associated with the second service load balancer in the second packet forwarding policy by the network node.

11. The method of claim 1, wherein the network node comprises a first plurality of packet forwarding policies for a first virtual service and a second plurality of packet forwarding policies for a second virtual service, wherein the comparing by the network node the virtual service network address in the virtual service session request with the virtual service network address in each packet forwarding policy comprises:
 determining by the network node whether the virtual service session request is for the first virtual service or the second virtual service;
 in response to determining that the virtual service session request is for the first virtual service, comparing by the network node the virtual service network address in the virtual service session request with a virtual service network address in each of the first plurality of packet forwarding policies; and
 in response to determining that the virtual service session request is for the first virtual service, comparing by the network node the virtual service network address in the virtual service session request with a virtual service network address in each of the second plurality of packet forwarding policies.

12. The method of claim 1, wherein the virtual service session request further comprises a client network address of the client device, wherein each packet forwarding policy further comprises a client network address associated with the destination, wherein the comparing by the network node the virtual service network address in the virtual service session request with the virtual service network address in each packet forwarding policy and the determining the given destination in the given packet forwarding policy by the network node comprise:
 comparing by the network node the virtual service network address in the virtual service session request with the virtual service network address in each packet forwarding policy;
 comparing by the network node the client network address in the virtual service session request with the client network address in each packet forwarding policy; and
 in response to finding the match between the virtual service network address in the virtual service session request and the given virtual service network address in the given packet forwarding policy, and in response to finding a match between the client network address in the virtual service session request and the given client network address in the given packet forwarding policy, determining the given destination in the given packet forwarding policy by the network node.

13. A non-transitory computer readable storage medium having computer readable program code embodied therewith for providing forwarding policies in a virtual service network, the virtual service network comprising a network node and a pool of service load balancers serving a virtual service associated with a virtual service network address, the computer readable program code configured to:
 receive a virtual service session request from a client device, the virtual service session request comprising the virtual service network address for the virtual service served by the pool of service load balancers, wherein the network node comprises a plurality of packet forwarding policies, each packet forwarding policy comprising a virtual service network address associated with a destination;
 compare the virtual service network address in the virtual service session request with the virtual service network address in each packet forwarding policy;
 in response to finding a match between the virtual service network address in the virtual service session request and a given virtual service network address in a given packet forwarding policy, determine the given destination in the given packet forwarding policy; and
 send the virtual service session request to a service load balancer in the pool of service load balancers associated with the given destination, wherein the service load balancer establishes a virtual service session with the client device.

14. The medium of claim 13, wherein the computer readable program code is further configured to, after the service load balancer establishes the virtual service session with the client device:
 receive a virtual service request from the client device through the virtual service session, the virtual service request comprising the virtual service network address for the virtual service;
 compare the second virtual service network address in the virtual service request with the virtual service network address in each packet forwarding policy;
 in response to finding a match between the virtual service network address in the virtual service request and a second given virtual service network address in a second given packet forwarding policy, determine a second given destination in the second given packet forwarding policy; and
 send the virtual service request to a second service load balancer associated with the second given destination.

15. The medium of claim 14, wherein the computer readable program code is further configured to:
 receive a virtual service data packet from the client device through the virtual service session, the virtual service data packet comprising the virtual service network address for the virtual service;
 compare the virtual service network address in the virtual service data packet with the virtual service network address in each packet forwarding policy;
 in response to finding a match between the virtual service network address in the virtual service data packet and a third given virtual service network address in a third given packet forwarding policy, determine a third given destination in the third given packet forwarding policy; and
 send the virtual service data packet to a third service load balancer associated with the third given destination.

16. The medium of claim 15, wherein the service load balancer, the second service load balancer, and the third service load balancer are the same service load balancer.

17. The medium of claim 13, wherein the computer readable program code is further configured to:
- receive a data packet of the virtual service session from the service load balancer over a data network, the data packet comprising a client network address of the client device;
- retrieve the client network address from the data packet; and
- send the data packet to the client device using the client network address.

18. The medium of claim 17, wherein the data packet comprises a virtual service session request response or a virtual service request response.

19. The medium of claim 13, wherein the given destination comprises a network node, wherein the computer readable program code configured to send the virtual service session request to a service load balancer in the pool of service load balancers associated with the given destination is further configured to:
- send the virtual service session request to the network node, wherein the network node comprises a second plurality of packet forwarding policies, each of the second plurality of packet forwarding policies comprising a second virtual service network address associated with a second destination;
- compare by the network node the virtual service network address in the virtual service session request with the virtual service network address in each of the second plurality of packet forwarding policies by the second network node;
- in response to finding a match between the virtual service network address in the virtual service session request and a second given virtual service network address in a second given packet forwarding policy, determine a second given destination in the second given packet forwarding policy; and
- send the virtual service session request to the service load balancer associated with the second given destination, wherein the service load balancer establishes a virtual service session with the client device.

20. The medium of claim 13, wherein the computer readable program code configured to determine the given destination in the given packet forwarding policy is further configured to:
- find that the virtual service network address in the virtual service session request matches a first virtual service network address in a first packet forwarding policy and a second virtual service network address in a second packet forwarding policy;
- select either the first packet forwarding policy or the second packet forwarding policy based on additional information comprised in the first and second packet forwarding policies; and
- determine the given destination in the selected packet forwarding policy.

21. The medium of claim 20, wherein the additional information comprises one or more of the following: a multi-path factor; and a traffic policy.

22. The medium of claim 20, wherein the first packet forwarding policy comprises a first destination associated with a first service load balancer in the pool of service load balancers, wherein the second packet forwarding policy comprises a second destination associated with a second service load balancer in the pool of service load balancers, wherein the first service load balancer is different from the second service load balancer, wherein the computer readable program code configured to determine the given destination in the selected packet forwarding policy is further configured to:
- in response to selecting the first packet forwarding policy, determine the first destination associated with the first service load balancer in the first packet forwarding policy; and
- in response to selecting the second packet forwarding policy, determine the second destination associated with the second service load balancer in the second packet forwarding policy.

23. The medium of claim 13, comprising a first plurality of packet forwarding policies for a first virtual service and a second plurality of packet forwarding policies for a second virtual service, wherein the computer readable program code configured to compare the virtual service network address in the virtual service session request with the virtual service network address in each packet forwarding policy is further configured to:
- determine whether the virtual service session request is for the first virtual service or the second virtual service;
- in response to determining that the virtual service session request is for the first virtual service, compare the virtual service network address in the virtual service session request with a virtual service network address in each of the first plurality of packet forwarding policies; and
- in response to determining that the virtual service session request is for the second virtual service, compare the virtual service network address in the virtual service session request with a virtual service network address in each of the second plurality of packet forwarding policies.

24. The medium of claim 13, wherein the virtual service session request further comprises a client network address of the client device, wherein each packet forwarding policy further comprises a client network address associated with the destination, wherein the computer readable program code configured to compare the virtual service network address in the virtual service session request with the virtual service network address in each packet forwarding policy and to determine the given destination in the given packet forwarding policy are further configured to:
- compare the virtual service network address in the virtual service session request with the virtual service network address in each packet forwarding policy;
- compare the client network address in the virtual service session request with the client network address in each packet forwarding policy; and
- in response to finding the match between the virtual service network address in the virtual service session request and the given virtual service network address in the given packet forwarding policy, and in response to finding a match between the client network address in the virtual service session request and the given client network address in the given packet forwarding policy, determine the given destination in the given packet forwarding policy.

25. A virtual service network, comprising:
- a pool of service load balancers serving a virtual service associated with a virtual service network address; and
- a network node comprising a plurality of packet forwarding policies, each packet forwarding policy comprising a virtual service network address associated with a destination, wherein the network node:
  - receives a virtual service session request from a client device, the virtual service session request comprising a virtual service network address for the virtual service served by the pool of service load balancers, wherein the network node;

compares the virtual service network address in the virtual service session request with the virtual service network address in each packet forwarding policy;

in response to finding a match between the virtual service network address in the virtual service session request and a given virtual service network address in a given packet forwarding policy, determines the given destination in the given packet forwarding policy; and sends the virtual service session request to a service load balancer in the pool of service load balancers associated with the given destination, wherein the service load balancer establishes a virtual service session with the client device.

26. The network of claim 25, wherein after the service load balancer establishes the virtual service session with the client device, the network node further:

receives a virtual service request from the client device through the virtual service session, the virtual service request comprising the virtual service network address for the virtual service;

compares the second virtual service network address in the virtual service request with the virtual service network address in each packet forwarding policy;

in response to finding a match between the virtual service network address in the virtual service request and a second given virtual service network address in a second given packet forwarding policy, determines a second given destination in the second given packet forwarding policy; and sends the virtual service request to a second service load balancer associated with the second given destination.

27. The network of claim 26, wherein the network node further:

receives a virtual service data packet from the client device through the virtual service session, the virtual service data packet comprising the virtual service network address for the virtual service;

compares the virtual service network address in the virtual service data packet with the virtual service network address in each packet forwarding policy;

in response to finding a match between the virtual service network address in the virtual service data packet and a third given virtual service network address in a third given packet forwarding policy, determines a third given destination in the third given packet forwarding policy; and sends the virtual service data packet to a third service load balancer associated with the third given destination.

28. The network of claim 27, wherein the service load balancer, the second service load balancer, and the third service load balancer are the same service load balancer.

29. The network of claim 25, wherein the network node further:

receives a data packet of the virtual service session from the service load balancer over a data network, the data packet comprising a client network address of the client device;

retrieves the client network address from the data packet; and sends the data packet to the client device using the client network address.

30. The network of claim 29, wherein the data packet comprises a virtual service session request response or a virtual service request response.

31. The network of claim 25, further comprising a second network node, wherein the given destination is associated with the second network node, wherein in the sending the virtual service session request to a service load balancer in the pool of service load balancers associated with the given destination, the network node further:

sends the virtual service session request to the second network node, wherein the second network node comprises a second plurality of packet forwarding policies, each of the second plurality of packet forwarding policies comprising a second virtual service network address associated with a second destination;

wherein the second network node:

compares the virtual service network address in the virtual service session request with the virtual service network address in each of the second plurality of packet forwarding policies;

in response to finding a match between the virtual service network address in the virtual service session request and a second given virtual service network address in a second given packet forwarding policy, determines a second given destination in the second given packet forwarding policy; and sends the virtual service session request to the service load balancer associated with the second given destination, wherein the service load balancer establishes a virtual service session with the client device.

32. The network of claim 25, wherein in the determining, the network node further:

finds that the virtual service network address in the virtual service session request matches a first virtual service network address in a first packet forwarding policy and a second virtual service network address in a second packet forwarding policy;

selects either the first packet forwarding policy or the second packet forwarding policy based on additional information comprised in the first and second packet forwarding policies; and determines the given destination in the selected packet forwarding policy.

33. The network of claim 32, wherein the additional information comprises one or more of a multi-path factor and a traffic policy.

34. The network of claim 32, wherein the first packet forwarding policy comprises a first destination associated with a first service load balancer in the pool of service load balancers, wherein the second packet forwarding policy comprises a second destination associated with a second service load balancer in the pool of service load balancers, wherein the first service load balancer is different from the second service load balancer, wherein in the determining the given destination in the selected packet forwarding policy, the network node:

in response to selecting the first packet forwarding policy, determines the first destination associated with the first service load balancer in the first packet forwarding policy; and in response to selecting the second packet forwarding policy, determines the second destination associated with the second service load balancer in the second packet forwarding policy.

35. The network of claim 25, wherein the network node comprises a first plurality of packet forwarding policies for a first virtual service and a second plurality of packet forwarding policies for a second virtual service, wherein in the comparing the virtual service network address in the virtual service session request with the virtual service network address in each packet forwarding policy, the network node:
- determines whether the virtual service session request is for the first virtual service or the second virtual service;
- in response to determining that the virtual service session request is for the first virtual service, compares the virtual service network address in the virtual service session request with a virtual service network address in each of the first plurality of packet forwarding policies; and
- in response to determining that the virtual service session request is for the second virtual service, compares the virtual service network address in the virtual service session request with a virtual service network address in each of the second plurality of packet forwarding policies.

36. The network of claim 25, wherein the virtual service session request further comprises a client network address of the client device, wherein each packet forwarding policy further comprises a client network address associated with the destination, wherein in comparing the virtual service network address in the virtual service session request with the virtual service network address in each packet forwarding policy and determining the given destination in the given packet forwarding policy, the network node:
- compares the virtual service network address in the virtual service session request with the virtual service network address in each packet forwarding policy;
- compares the client network address in the virtual service session request with the client network address in each packet forwarding policy; and
- in response to finding the match between the virtual service network address in the virtual service session request and the given virtual service network address in the given packet forwarding policy, and in response to finding a match between the client network address in the virtual service session request and the given client network address in the given packet forwarding policy, determines the given destination in the given packet forwarding policy.

37. A method for providing forwarding policies in a virtual service network, the virtual service network comprising a network node and a pool of service load balancers serving a virtual service associated with a virtual service network address, comprising:
- receiving a virtual service session request from a client device by the network node, the virtual service session request comprising a client device network address for the client device and the virtual service network address for the virtual service served by the pool of service load balancers, wherein the network node comprises a plurality of packet forwarding policies, each packet forwarding policy comprising a client network address and a virtual service network address associated with a destination;
- comparing by the network node the virtual service network address in the virtual service session request with a first virtual service network address in a first packet forwarding policy of the plurality of packet forwarding policies, and comparing the client device network address in the virtual service session request with a first client network address in the first packet forwarding policy;
- in response to determining that the virtual service network address in the virtual service session request matches the first virtual service network address, and determining that the client device network address in the virtual service session request does not match the first client network address, determining by the network node that the first packet forwarding policy does not apply to the virtual service session request;
- in response to determining that the first packet forwarding policy does not apply, comparing by the network node the virtual service network address in the virtual service session request with a second virtual service network address in a second packet forwarding policy of the plurality of packet forwarding policies, and comparing the client device network address in the virtual service session request with a second client network address in the second packet forwarding policy;
- in response to determining that the virtual service network address in the virtual service session request matches the second virtual service network address, and determining that the client device network address in the virtual service session request matches the second client network address, determining by the network node that the second packet forwarding policy applies to the virtual service session request;
- in response to determining that the second packet forwarding policy applies, determining a given destination in the second packet forwarding policy by the network node; and
- sending the virtual service session request to a service load balancer in the pool of service load balancers associated with the given destination, wherein the service load balancer establishes a virtual service session with the client device.

\* \* \* \* \*